(12) United States Patent
Chiao

(10) Patent No.: US 9,658,976 B2
(45) Date of Patent: May 23, 2017

(54) DATA WRITING SYSTEM AND METHOD FOR DMA

(71) Applicant: MediaTek Inc., Hsin-Chu (TW)

(72) Inventor: Mong-Ling Chiao, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 390 days.

(21) Appl. No.: 14/535,625

(22) Filed: Nov. 7, 2014

(65) Prior Publication Data

US 2016/0132442 A1    May 12, 2016

(51) Int. Cl.
| G06F 12/00 | (2006.01) |
| G06F 13/28 | (2006.01) |
| G06F 13/40 | (2006.01) |
| G06F 12/0893 | (2016.01) |

(52) U.S. Cl.
CPC .......... *G06F 13/28* (2013.01); *G06F 12/0893* (2013.01); *G06F 13/4027* (2013.01); *G06F 2212/6022* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 6,442,674 B1 * | 8/2002 | Lee | G06F 9/3802 712/205 |
| 7,729,151 B2 * | 6/2010 | Tsern | G11C 5/02 365/189.2 |

* cited by examiner

*Primary Examiner* — Cheng-Yuan Tseng
(74) *Attorney, Agent, or Firm* — McClure, Qualey & Rodack, LLP

(57) ABSTRACT

A data writing system is provided. A processing unit includes at least one core processor. The dynamic random access memory (DRAM) includes a user buffer storing data to be written to a storage device, a buffer cache and a direct memory access (DMA) buffer. The processing unit executes a plurality of write transactions for moving a portion of the data from the user buffer of the DRAM to the storage device via a first write path, and the remainder of the data from the user buffer of the DRAM to the storage device via a second write path. The first write path passes through the buffer cache of the DRAM, and the second write path does not pass through the buffer cache of the DRAM.

22 Claims, 5 Drawing Sheets

DATA WRITING SYSTEM AND METHOD FOR DMA

BACKGROUND OF THE INVENTION

Field of the Invention

The invention relates to a data writing system, and more particularly to a data writing method for direct memory access (DMA).

Description of the Related Art

In a typical electronic system that comprises one or more processors, memories, and input/output (I/O) devices or interfaces, direct memory access (DMA) transfers are often used to transfer data between the I/O and the memory. When the processor uses programmed input/output without DMA, it is typically fully occupied for the entire duration of the read or write operation, and is thus unavailable to perform other tasks for the processor. When the processor initiates a DMA transfer, the processor can do other operations while the DMA transfer is in progress, and it receives an interrupt when the DMA transfer is done. Many hardware systems use DMA, including disk-drive controllers, graphics cards, network cards and sound cards. DMA is also used for intra-chip data transfer in multi-core processors. The electronic systems that have DMA channels can transfer data to and from devices with much less processor overhead than the electronic systems without DMA channels. Similarly, a processing element inside a multi-core processor can transfer data to and from its local memory without occupying its processor time, allowing computation and data transfer to proceed in parallel.

BRIEF SUMMARY OF THE INVENTION

A data writing system and a data writing method are provided. An embodiment of a data writing system is provided. The data writing system comprises a processing unit, a storage device, a dynamic random access memory (DRAM), and a bus arbiter coupled between the processing unit, the DRAM and the storage device. The processing unit comprises at least one core processor. The DRAM comprises a user buffer storing data to be written to the storage device, a buffer cache and a direct memory access (DMA) buffer. The processing unit executes a plurality of write transactions for moving a portion of the data from the user buffer of the DRAM to the storage device via a first write path, and the remainder of the data from the user buffer of the DRAM to the storage device via a second write path. The first write path passes through the buffer cache of the DRAM, and the second write path does not pass through the buffer cache of the DRAM.

Furthermore, an embodiment of a data writing method for a core processor is provided, wherein the core processor writes data from a dynamic random access memory (DRAM) to a storage device through a bus arbiter coupled between the DRAM, the storage device and the core processor. A plurality of first write transactions are executed to move a portion of the data from a user buffer of the DRAM to the storage device via a first write path, wherein the portion of data is accessed through the bus arbiter five times in the first write path when the first write transactions are completed. It is determined whether to perform a sequential write process according to the number of the first write transactions. A plurality of second write transactions are executed when the sequential write process is performed, so as to move the remainder of the data from the user buffer of the DRAM to the storage device via a second write path, wherein the remainder of the data is accessed through the bus arbiter three times in the second write path when the second write transactions are completed. The DRAM further comprises a buffer cache and a direct memory access (DMA) buffer.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
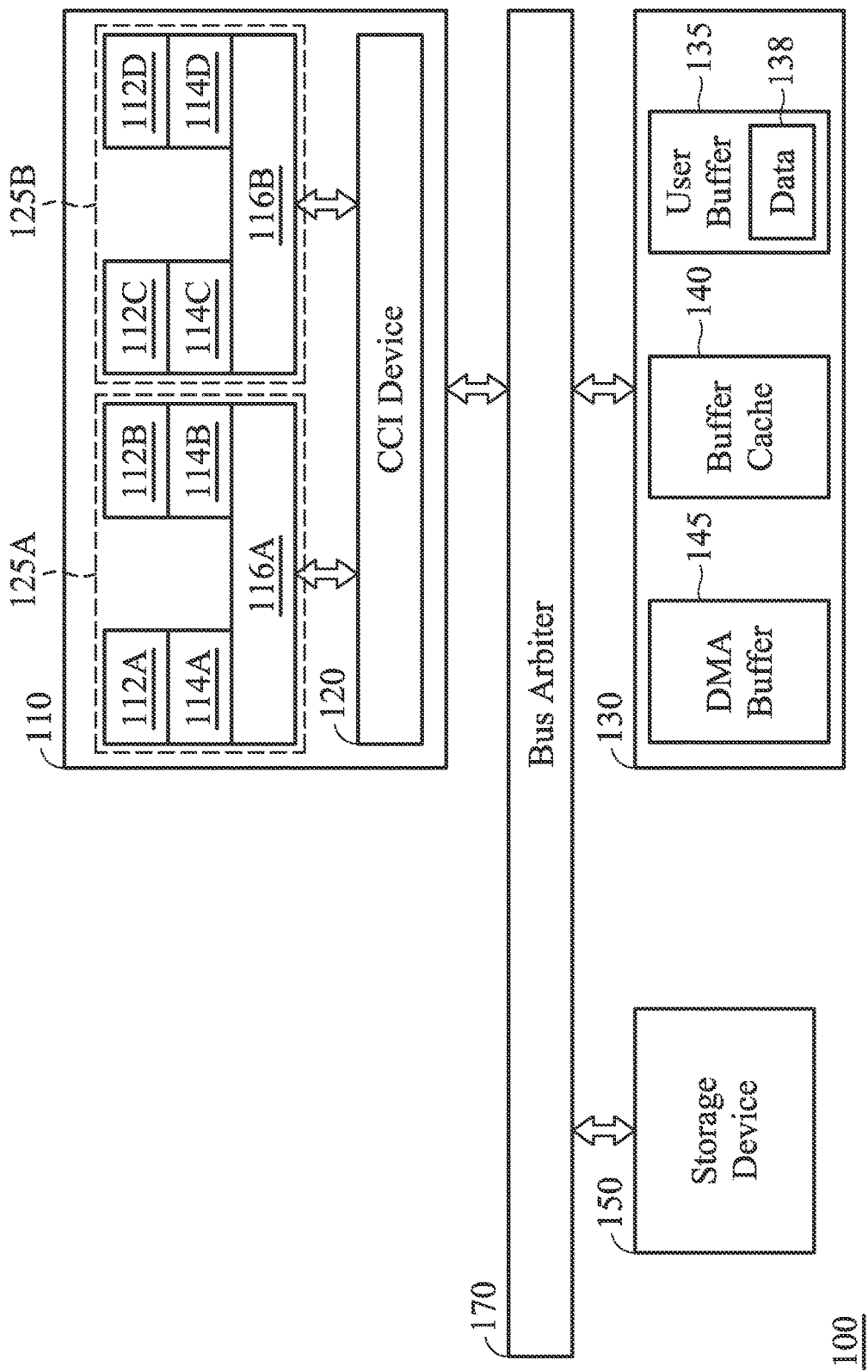
FIG. 1 shows a data writing system according to an embodiment of the invention.

FIG. 1 shows a data writing system 100 according to an embodiment of the invention. The data writing system 100 comprises a processing unit 110, a dynamic random access memory (DRAM) 130, a storage device 150 and a bus arbiter 170. The bus arbiter 170 is coupled between the processing unit 110, the DRAM 130 and the storage device 150, and is capable of allocating access to the DRAM 130 and the storage device 150. The processing unit 110 comprises two processor clusters 125A and 125B and a cache coherent interconnect (CCI) device 120. Each of the processor clusters 125A and 125B comprises a plurality of core processors and the corresponding caches. For example, the processor cluster 125A comprises a core processor 112A, a core processor 112B, a level 1 cache 114A corresponding to the core processor 112A, a level 1 cache 114B corresponding to the core processor 112B, and a level 2 cache 116A corresponding to the core processors 112A and 112B. Furthermore, the processor cluster 125B comprises a core processor 112C, a core processor 112D, a level 1 cache 114C corresponding to the core processor 112C, a level 1 cache 114D corresponding to the core processor 112D, and a level 2 cache 116B corresponding to the core processors 112C and 112D. The DRAM 130 comprises a user buffer 135 for storing the mass data 138, a buffer cache 140 and a direct memory access (DMA) buffer 145, wherein the storage capacity of the buffer cache 140 is smaller than that of the user buffer 135 and the DMA buffer 145 in the DRAM 130. In one embodiment, the data writing system 100 can be implemented in a portable electronic device, and the storage device 150 may be an embedded multimedia card (eMMC) or a USB Flash Device (UFD). In FIG. 1, one of the core processors 112A-112D is used to perform a write operation for writing the data 138 stored in the DRAM 130 into the storage device 150 via the bus arbiter 170. Furthermore, the write operation can be divided into a first phase and a second phase. The detail of the first and second phases will be described below.

Figure 2A:
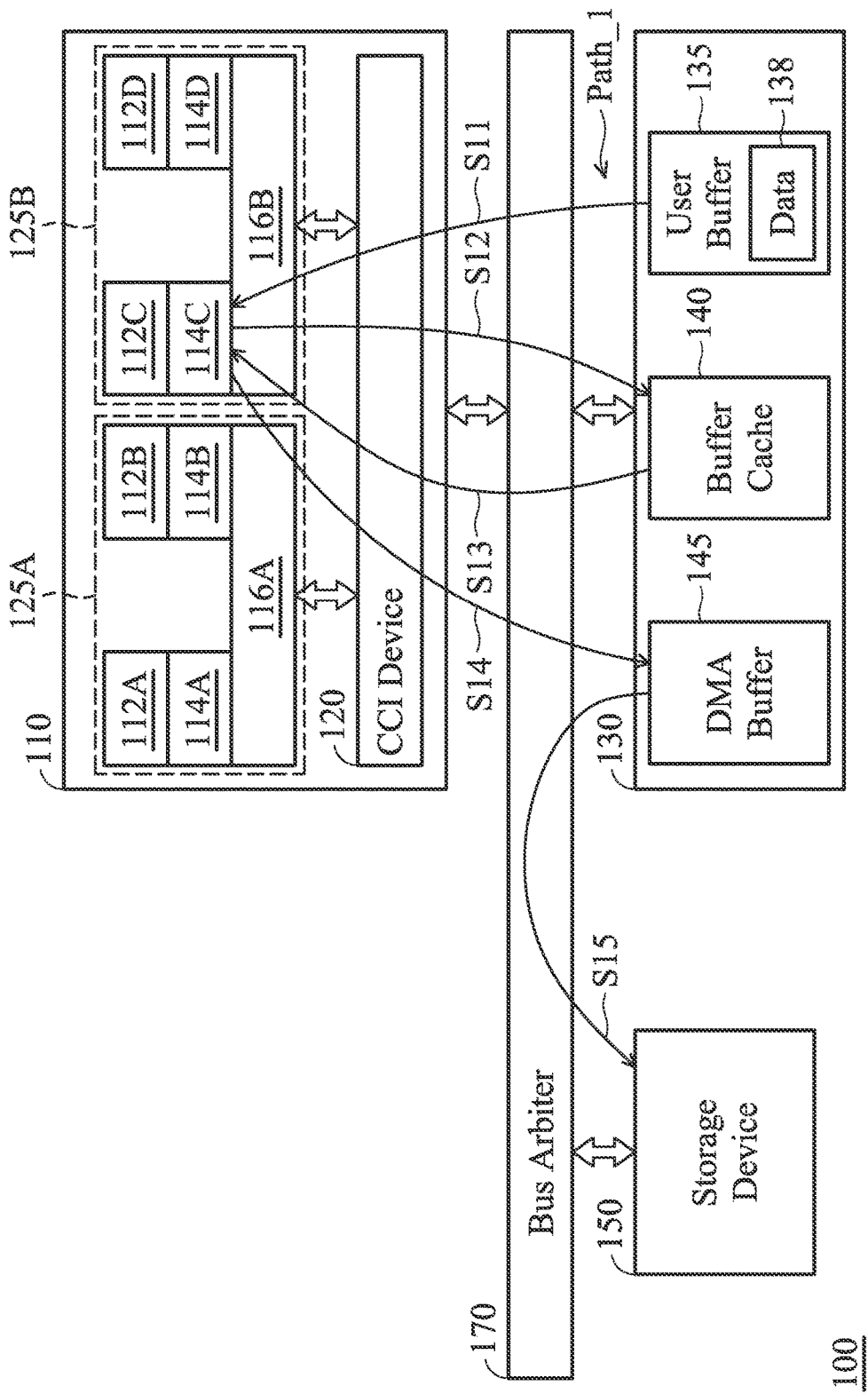
FIG. 2A and FIG. 2B respectively show the first and second phases P1 and P2 of the write operation according to an embodiment of the invention.
Figure 2B:
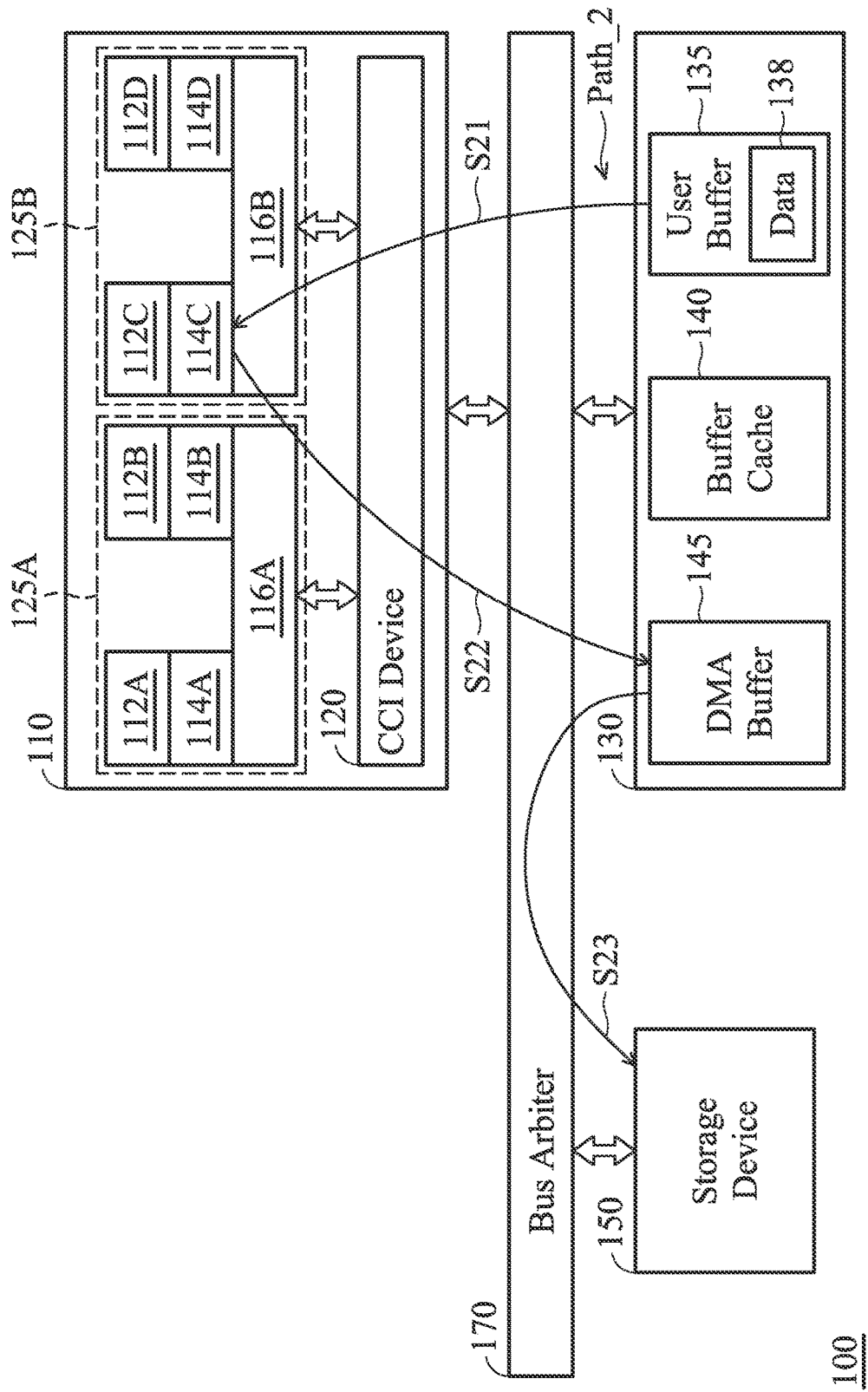
Figure 3:
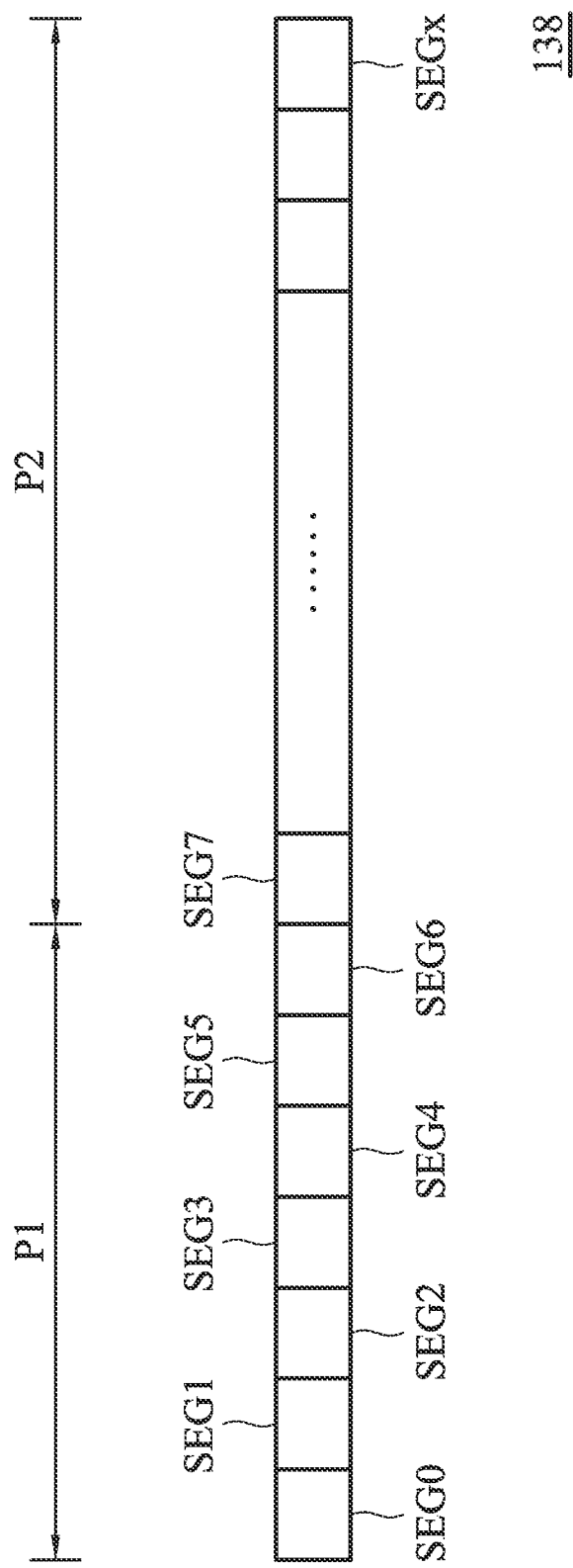
FIG. 3 shows a schematic illustrating the relationship between the data 138 of FIG. 1 and the first and second phases P1 and P2 of the write operation.

FIG. 2A and FIG. 2B respectively show the first and second phases P1 and P2 of the write operation according to an embodiment of the invention, and FIG. 3 shows a schematic illustrating the relationship of the data 138 of FIG. 1 and the first and second phases P1 and P2 of the write operation. In FIG. 3, the data 138 are divided into a plurality of data segments SEG0-SEGx, wherein each segment corresponds to a write transaction. Referring to FIG. 2A and FIG. 3 together, it is assumed that the core processor 112C is used to perform the write operation. In the first phase P1 of the write operation, the core processor 112C executes the write transactions to move the data segments SEG0-SEG6 of the data 138 from the user buffer 135 of the DRAM 130 to the storage device 150 via a first write path Path_1, wherein the first write path Path_1 comprises five segments S11, S12, S13, S14 and S15. For example, if the transaction corresponding to the data segment SEG0 is executed by the core processor 112C, the data segment SEG0 is moved from the user buffer 135 of the DRAM 130 to the level 1 cache 114C of the core processor 112C via the bus arbiter 170 first, i.e. the segment S11 of the write path Path_1. Next, the data segment SEG0 is moved from the level 1 cache 114C of the core processor 112C to the buffer cache 140 of the DRAM 130 via the bus arbiter 170 (i.e. the segment S12 of the first write path Path_1). Next, the data segment SEG0 is moved from the buffer cache 140 of the DRAM 130 to the level 1 cache 114C of the core processor 112C via the bus arbiter 170, i.e. the segment S13 of the first write path Path_1. Next, the data segment SEG0 is moved from the level 1 cache 114C of the core processor 112C to the DMA buffer 145 of the DRAM 130 via the bus arbiter 170, i.e. the segment S14 of the first write path Path_1. Next, the data segment SEG0 is moved from the DMA buffer 145 of the DRAM 130 to the storage device 150 via the bus arbiter 170, i.e. the segment S15 of the first write path Path_1. Thus, the transaction corresponding to the data segment SEG0 is completed. Furthermore, in the first phase P1 of the write operation, each data segment is accessed through the bus arbiter 170 five times in the write path Path_1 when the transaction corresponding to the data segment is executed and completed. In other words, the level 1 cache 114C of the core processor 112C obtains each data segment twice when the data segment is moved from the user buffer 135 of the DRAM 130 to the storage device 150 via the first write path Path_1.

When the number of the data segments to be written to the storage device 150 in the first phase P1 of the write operation exceeds a specific number, the core processor 112C will determine that the write operation is a sequential write operation, and enter the second phase P2 of the write operation to perform a sequential write process. Specifically, when the number of the write transactions exceeds the specific number, the sequential write process is performed, wherein the write transactions correspond to the data segments moved from the DRAM 130 to the storage device 150 via the first write path Path_1. It should be noted that the specific number is determined according to various applications. Referring to FIG. 2B and FIG. 3 together, in the second phase P2 of the write operation, the core processor 112C executes the write transactions to move the remaining data segments SEG7-SEGx of the data 138 from the user buffer 135 of the DRAM 130 to the storage device 150 via a second write path Path_2, wherein the second write path Path_2 comprises three segments S21, S22 and S23. For example, if the transaction corresponding to the data segment SEG7 is executed by the core processor 112C, the data segment SEG7 is moved from the user buffer 135 of the DRAM 130 to the level 1 cache 114C of the core processor 112C via the bus arbiter 170 first, i.e. the segment S21 of the second write path Path_2. Next, the data segment SEG7 is moved from the level 1 cache 114C of the core processor 112C to the DMA buffer 145 of the DRAM 130 via the bus arbiter 170, i.e. the segment S22 of the second write path Path_2. Next, the data segment SEG7 is moved from the DMA buffer 145 of the DRAM 130 to the storage device 150 via the bus arbiter 170, i.e. the segment S23 of the second write path Path_2. Thus, the transaction corresponding to the data segment SEG7 is completed. Furthermore, in the second phase P2 of the write operation, each data segment is accessed through the bus arbiter 170 three times in the second write path Path_2 when the transaction corresponding to the data segment is executed and completed. In other words, the level 1 cache 114C of the core processor 112C obtains each data segment only one time when the data segment is moved from the user buffer 135 of the DRAM 130 to the storage device 150 via the second write path Path_2. Specifically, the buffer cache 140 of the DRAM 130 will not be occupied in the second phase P2 of the write operation, thus decreasing power consumption and access time for the DRAM 130. Furthermore, the number of the write transactions in the first phase P1 of the write operation is smaller than the number of the write transactions in the second phase P2 of the write operation.

Figure 4:
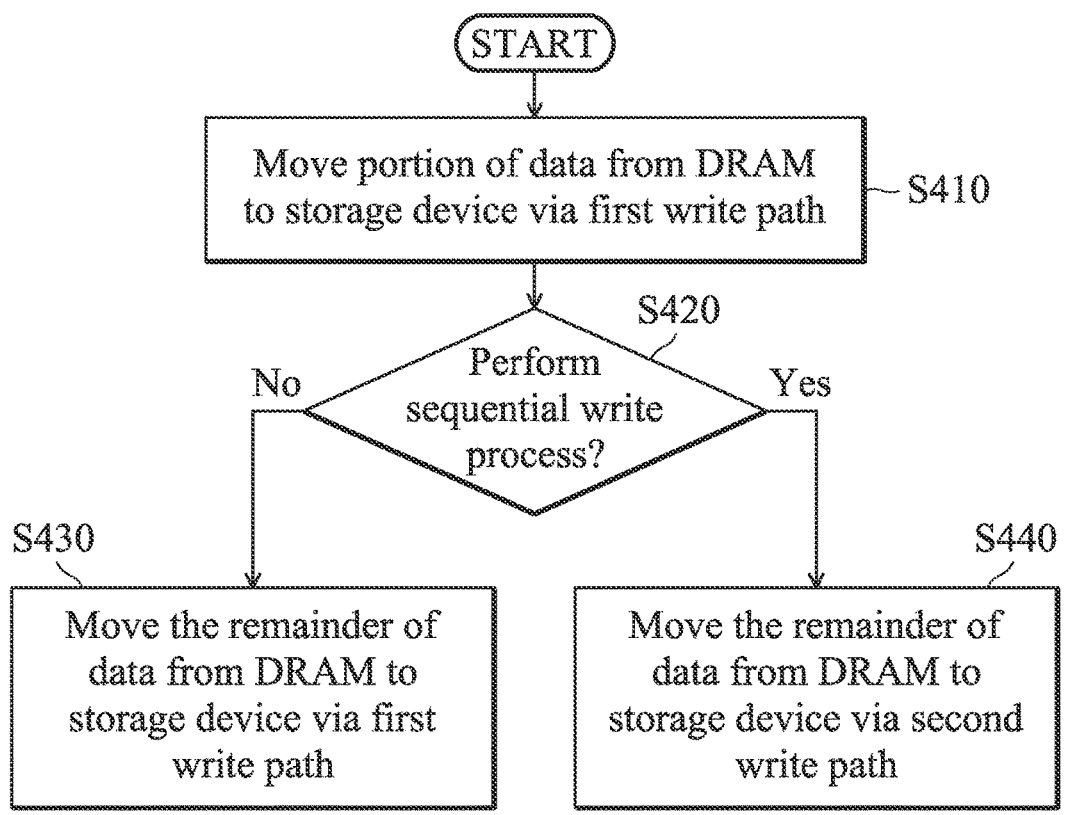
FIG. 4 shows a data writing method for a core processor according to an embodiment of the invention.

FIG. 4 shows a data writing method for a core processor according to an embodiment of the invention, wherein the core processor writes data from a dynamic random access memory (DRAM) to a storage device through a bus arbiter coupled between the DRAM, the storage device and the core processor. In the embodiment, the DRAM comprises a user buffer, a buffer cache and a DMA buffer, and the data to be written to the storage device is stored in the user buffer, as shown in the DRAM 130 of the FIG. 1. First, in step S410, the core processor executes a plurality of write transactions to move a portion of the data from the user buffer of the DRAM to the storage device via a first write path, e.g. the write path Path_1 of FIG. 2A. As described above, the portion of data is accessed through the bus arbiter five times in the first write path when the write transactions corresponding to the portion of data are completed. For example, the portion of data is moved from the user buffer of the DRAM to a level 1 cache of the core processor via the bus arbiter first. Next, the portion of data is moved from the level 1 cache of the core processor to the buffer cache of the DRAM via the bus arbiter. Next, the portion of data is moved from the buffer cache of the DRAM to the level 1 cache of the core processor via the bus arbiter. Next, the portion of data is moved from the level 1 cache of the core processor to the DMA buffer of the DRAM via the bus arbiter. Next, the portion of data is moved from the DMA buffer of the DRAM to the storage device via the bus arbiter. In step S420, the core processor determines whether to perform a sequential write process according to the number of the write transactions executed in step S410. If the number of the write transactions executed in step S410 does not exceed a specific number, the core processor continues to move the remainder of the data from the user buffer of the DRAM to the storage device via the first write path (step S430). Conversely, if the number of the write transactions executed in step S410 exceeds the specific number, the core processor will determine that the write operation is a sequential write operation, and then the sequential write process is performed (step S440), so as to move the remainder of the data from the user buffer of the DRAM to the storage device via a second write path, wherein the second write path is shorter than the first write path, e.g. the write path Path_2 of FIG. 2B. As described above, the remainder of data is accessed through the bus arbiter three times in the second write path when the write transactions corresponding to the portion of data are completed. For example, the remainder of data is moved from the user buffer of the DRAM to a level 1 cache of the core processor via the bus arbiter first. Next, the remainder of data is moved from the level 1 cache of the core processor to the DMA buffer of the DRAM via the bus arbiter without through the buffer cache of the DRAM. Next, the remainder of data is moved from the DMA buffer of the DRAM to the storage device via the bus arbiter.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data writing system, comprising:
a processing unit;
a storage device;
a dynamic random access memory (DRAM), comprising:
    an user buffer, storing data to be written to the storage device;
    a buffer cache; and
    a direct memory access (DMA) buffer; and
a bus arbiter coupled between the processing unit, the DRAM and the storage device,
wherein the processing unit executes a plurality of write transactions for moving a portion of the data from the user buffer of the DRAM to the storage device via a first write path, and the remainder of the data from the user buffer of the DRAM to the storage device via a second write path,
wherein the first write path passes through the buffer cache of the DRAM, and the second write path does not pass through the buffer cache of the DRAM.

2. The data writing system as claimed in claim 1, wherein the processing unit comprises at least one core processor, wherein the processing unit executes a plurality of first write transactions to move the portion of the data from the user buffer of the DRAM to the storage device via a level 1 cache of the core processor, the buffer cache, the level 1 cache of the core processor and the DMA buffer in sequence.

3. The data writing system as claimed in claim 2, wherein when the number of the first write transactions exceeds a specific number, the processing unit performs a sequential write process for the remainder of the data, so as to move the remainder of the data from the user buffer of the DRAM to the storage device via the second write path.

4. The data writing system as claimed in claim 2, wherein the processing unit executes a plurality of second write transactions to move the remainder of the data from the user buffer of the DRAM to the storage device via the level 1 cache of the core processor and the DMA buffer in sequence.

5. The data writing system as claimed in claim 4, wherein the number of the first write transactions is smaller than the number of the second write transactions.

6. The data writing system as claimed in claim 1, wherein the processor unit comprises at least one processor cluster, and the processor cluster comprises a plurality of core processors, wherein the portion of the data is moved from the user buffer of the DRAM to the storage device through a level 1 cache of one of the core processors twice in the first write path, and the remainder of the data is moved from the user buffer of the DRAM to the storage device through the level 1 cache of the core processors only one time in the second write path.

7. The data writing system as claimed in claim 1, wherein the storage device is an embedded multimedia card (eMMC) or a USB Flash Device (UFD).

8. The data writing system as claimed in claim 1, wherein a storage capacity of the buffer cache is smaller than that of the user buffer and the DMA buffer in the DRAM.

9. A data writing method for a core processor, wherein the core processor writes data from a dynamic random access memory (DRAM) to a storage device through a bus arbiter coupled between the DRAM, the storage device and the core processor, comprising:
    executing a plurality of first write transactions to move a portion of the data from a user buffer of the DRAM to the storage device via a first write path, wherein the portion of data is accessed through the bus arbiter five times in the first write path when the first write transactions are completed;
    determining whether to perform a sequential write process according to the number of the first write transactions; and
    executing a plurality of second write transactions when the sequential write process is performed, so as to move the remainder of the data from the user buffer of the DRAM to the storage device via a second write path, wherein the remainder of the data is accessed through the bus arbiter three times in the second write path when the second write transactions are completed,
    wherein the DRAM further comprises a buffer cache and a direct memory access (DMA) buffer.

10. The data writing method as claimed in claim 9, further comprising:
    performing the sequential write process for the remainder of the data when the number of the first write transactions exceeds a specific number.

11. The data writing method as claimed in claim 9, wherein when each of the first write transactions is executed, by passing through the bus arbiter, the data corresponding to the first write transaction is moved from the user buffer of the DRAM to the storage device via a level 1 cache of the core processor, the buffer cache, the level 1 cache of the core processor and the DMA buffer in sequence.

12. The data writing method as claimed in claim 11, wherein when each of the second write transactions is executed, by passing through the bus arbiter, the data corresponding to the second write transaction is moved from the user buffer of the DRAM to the storage device via the level 1 cache of the core processor and the DMA buffer in sequence.

13. The data writing method as claimed in claim 9 wherein the number of the first write transactions is smaller than the number of the second write transactions.

14. The data writing method as claimed in claim 9, wherein the storage device is an embedded multimedia card (eMMC) or a USB Flash Device (UFD).

15. The data writing method as claimed in claim 9, wherein a storage capacity of the buffer cache is smaller than that of the user buffer and the DMA buffer in the DRAM.

16. A data writing method for a core processor, wherein the core processor stores data from a dynamic random access memory (DRAM) to a storage device, comprising:

executing a plurality of first write transactions to move a portion of the data from a user buffer of the DRAM to the storage device via a first write path, wherein a level 1 cache of the core processor obtains the portion of data twice when the portion of data is moved from the user buffer of the DRAM to the storage device via the first write path;

determining whether to perform a sequential write process according to the number of the first write transactions; and executing a plurality of second write transactions when the sequential write process is performed, so as to move the remainder of the data from the user buffer of the DRAM to the storage device in a second write path, wherein the level 1 cache of the core processor obtains the portion of data only one time when the remainder of data is moved from the user buffer of the DRAM to the storage device via the second write path, wherein the DRAM further comprises a buffer cache and a direct memory access (DMA) buffer.

17. The data writing method as claimed in claim 16, further comprising:

performing the sequential write process for the remainder of the data when the number of the first write transactions exceeds a specific number.

18. The data writing method as claimed in claim 16, wherein when each of the first write transactions is executed, the data corresponding to the first write transaction is moved from the user buffer of the DRAM to the storage device via the level 1 cache of the core processor, the buffer cache, the level 1 cache of the core processor, and the DMA buffer in sequence.

19. The data writing method as claimed in claim 18, wherein when each of the second write transactions is executed, the data corresponding to the second write transaction is moved from the user buffer of the DRAM to the storage device via the level 1 cache of the core processor and the DMA buffer in sequence.

20. The data writing method as claimed in claim 16, wherein the number of the first write transactions is smaller than the number of the second write transactions.

21. The data writing method as claimed in claim 16, wherein the storage device is an embedded multimedia card (eMMC) or a USB Flash Device (UFD).

22. The data writing method as claimed in claim 16, wherein a storage capacity of the buffer cache is smaller than that of the user buffer and the DMA buffer in the DRAM.

\* \* \* \* \*